(12) United States Patent
Simon Kreuz et al.

(10) Patent No.: US 11,423,616 B1
(45) Date of Patent: Aug. 23, 2022

(54) SYSTEMS AND METHODS FOR RENDERING AVATAR WITH HIGH RESOLUTION GEOMETRY

(71) Applicant: Facebook Technologies, LLC, Menlo Park, CA (US)

(72) Inventors: Tomas Simon Kreuz, Pittsburgh, PA (US); Jason Saragih, Pittsburgh, PA (US); Stephen Anthony Lombardi, Pittsburgh, PA (US); Shugao Ma, Pittsburgh, PA (US); Gabriel Bailowitz Schwartz, Pittsburgh, PA (US)

(73) Assignee: Facebook Technologies, LLC., Menlo Park, CA (US)

( * ) Notice: Subject to any disclaimer, the term of this patent is extended or adjusted under 35 U.S.C. 154(b) by 104 days.

(21) Appl. No.: 16/833,360

(22) Filed: Mar. 27, 2020

(51) Int. Cl.
| | |
|---|---|
| *G06T 17/20* | (2006.01) |
| *G06T 7/50* | (2017.01) |
| *G06N 20/00* | (2019.01) |
| *G06T 7/73* | (2017.01) |

(52) U.S. Cl.
CPC ............ *G06T 17/20* (2013.01); *G06N 20/00* (2019.01); *G06T 7/50* (2017.01); *G06T 7/73* (2017.01); *G06T 2207/10028* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 6,208,347 B1 * | 3/2001 | Migdal | G06T 17/20 345/419 |
| 2020/0184651 A1 * | 6/2020 | Mukasa | G06N 20/00 |

OTHER PUBLICATIONS

Eigen et al. ("Predicting Depth, Surface Normals and Semantic Labels with a Common Multi-Scale Convolutional Architecture") Proceedings of the IEEE International Conference on Computer Vision (ICCV), 2015, pp. 2650-2658 (Year: 2015).*
Shu et al., Deforming Autoencoders: Unsupervised Disentangling of Shape and Appearance, arXiv:1806.06503v1 [cs.Cv], 29 pages, Jun. 18, 2018.

* cited by examiner

*Primary Examiner* — Yanna Wu
(74) *Attorney, Agent, or Firm* — Baker Botts L.L.P.

(57) ABSTRACT

In one embodiment, a system may access an input image of an object captured by cameras, and the input image depicts appearance information associated with an object. The system may generate a first mesh of the object based on features identified from the input image of the object. The system may generate, by processing the first mesh using a machine-learning model, a position map that defines a contour of the object. Each pixel in the position map corresponds to a three-dimensional coordinate. The system may further generate a second mesh based on the position map, wherein the second mesh has a higher resolution than the first mesh. The system may render an output image of the object based on the second mesh. The system disclosed in the present application can render a dense mesh which has a higher resolution to provide details which cannot be compensated by texture information.

20 Claims, 10 Drawing Sheets
(7 of 10 Drawing Sheet(s) Filed in Color)

SYSTEMS AND METHODS FOR RENDERING AVATAR WITH HIGH RESOLUTION GEOMETRY

TECHNICAL FIELD

This disclosure generally relates to avatar rendering, and more specifically method, apparatus, and system for rendering an avatar based on a high-resolution mesh.

BACKGROUND

An avatar generating architecture generally comprises encoding observations of a user, decoding the observations into (1) a mesh geometry and (2) a view-dependent texture, and rendering an avatar based on the mesh geometry and the view-dependent texture. However, the mesh geometry can be of low resolution or lack information to generate certain facial details (e.g., a protruding tongue or the interior of the mouth), and the textures from different views cannot compensate these absent details because of the missing/inaccurate geometry.

SUMMARY OF PARTICULAR EMBODIMENTS

To address the foregoing problems, disclosed are methods, apparatuses, and a system, to render an avatar based on a high-resolution geometry. The present disclosure provides a method to generate a high-resolution mesh to render an avatar with details. The present disclosure generates a position map defining the geometry of an object which is generated by improving a primary mesh of the object. Each pixel in the position map comprises a coordinate to represent a location of the pixel in an object coordinate space. Based on vertices determined from the pixels in the position map, the method disclosed in the present application can generate a dense mesh which has a higher resolution geometry than the primary mesh. A rendered image of the present application based on the dense mesh can compensate details which are absent in the primary mesh.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises accessing one or more input images of an object captured by one or more cameras, and the one or more input images depict appearance information associated with the object. The method further comprises generating a first mesh of the object based on features identified from the one or more input images of the object. The method yet further comprises generating, by processing the first mesh using a machine-learning model, a position map that defines a contour of the object. Each pixel in the position map corresponds to a three-dimensional coordinate. The method yet further comprises generating a second mesh based on the position map. The second mesh has a higher resolution than the first mesh. The method further comprises rendering an output image of the object based on the second mesh.

In one embodiment, generating the second mesh based on the position map comprises sampling pixels in the position map based on geometry, determining vertices from each of the sampled pixels in the position map, and generating the second mesh based on the determined vertices.

In one embodiment, the method further comprises determining a corresponding color for each pixel in the position map based on a first texture of the object which is generated based on the one or more input images of the object from at least one viewpoint, generating a second texture for the object based on the corresponding color for each pixel and the at least one viewpoint, and rendering an avatar of the object based on the second mesh and the second texture.

In one embodiment, the machine-learning model is trained by comparing the output image of the object with the one or more input images of the object, and calculating an image loss based on the comparison to update the machine-learning model.

In one embodiment, the machine-learning model is trained by measuring input depth measurements in the one or more input images of the object, computing output depth measurements in the output image of the object, comparing the output depth measurements with the input depth measurements, and calculating an output depth loss based on the comparison to update the machine-learning model.

In one embodiment, the machine-learning model is trained by measuring input depth measurements in the one or more input images of the object, smoothing depth in the output image of the object to obtain a curvature of the object, computing smoothed depth measurements in the output image of the object, comparing the smoothed depth measurements with the input depth measurements, and calculating a normal loss based on the comparison to update the machine-learning model.

In one embodiment, the machine-learning model is trained by comparing each of the features in the one or more input images of the object with its corresponding feature in the output image of the object, and calculating a tracking loss based on the comparison to update the machine-learning model.

In one embodiment, the machine-learning model is configured to generate images for television monitors, cinema screens, computer monitors, mobile phones, or tablets.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a method for rendering an avatar of an object based on a high-resolution mesh/geometry via a machine-learning model. Particular embodiments disclosed in the present application generate a position map, which comprises pixels defining a contour of the object, based on a codec/input images of the object via the machine-learning model. Each pixel has a three-dimensional coordinate representing a location of the pixel which is later used to generate a corresponding vertex in a mesh. Particular embodiments disclosed in the present application generate the mesh based on the position map which has high resolution due to dense vertices that could be determined from the position map. Therefore, the dense mesh rendered by the machine-learning model disclosed in the present application provides assistance in rendering an image of the object which reproduces the object accurately with details.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains drawings executed in color. Copies of this patent or patent application publication with color drawing(s) will be provided by the Office upon request and payment of the necessary fee.

The accompanying drawing figures incorporated in and forming a part of this specification illustrate several aspects of the disclosure, and together with the description serve to explain the principles of the disclosure.

DESCRIPTION OF EXAMPLE EMBODIMENTS

Current avatar rendering systems face several challenges, such as there are details, which exist in input images, missing from a rendered image. For example, a protruding tongue might be absent in the rendered image due to a lack of geometry information. In order to reproduce the object from the input images accurately, a convolutional position map is estimated to generate a dense mesh which has higher resolution than an input mesh. The dense mesh provides sufficient geometry information of the object to render an image of the object. Embodiments described herein provide a method to generate a position map using a machine-learning model, which position map comprises pixels having corresponding coordinates for a better spatial structure to render a high-resolution mesh for the object. Therefore, the image of the object rendered based on the high-resolution mesh described in the present disclosure can reproduce details from input images accurately in the rendered image.

Furthermore, a texture of the object in the embodiments described herein can be reproduced in a similar manner as the high-resolution mesh production via a machine-learning model as well. The texture of the object in the present disclosure can also be re-aligned or deformed using a warp field, e.g., displacement field, to obtain an accurate, higher-resolution final texture for the rendered image of the object.

The term "avatar" may, in some examples, refer to a rendered image of a subject, such as a rendered image of a subject that is animated and interactive within the context of a VR/AR presentation. In some examples, a "subject" may comprise a human face. It should be appreciated, however, that the term "subject" as used herein may encompass any portion or entirety of a human or other animal. Also, the term "subject" as used herein may encompass clothing, plants, and other objects.

As discussed above, particular embodiments may use machine learning to generate the desired outputs for the object with details which are absent from the input mesh. Provided below is an overview of particular embodiments of a machine-learning architecture and its inputs and training procedures to support rendering for displays.

Figure 1:
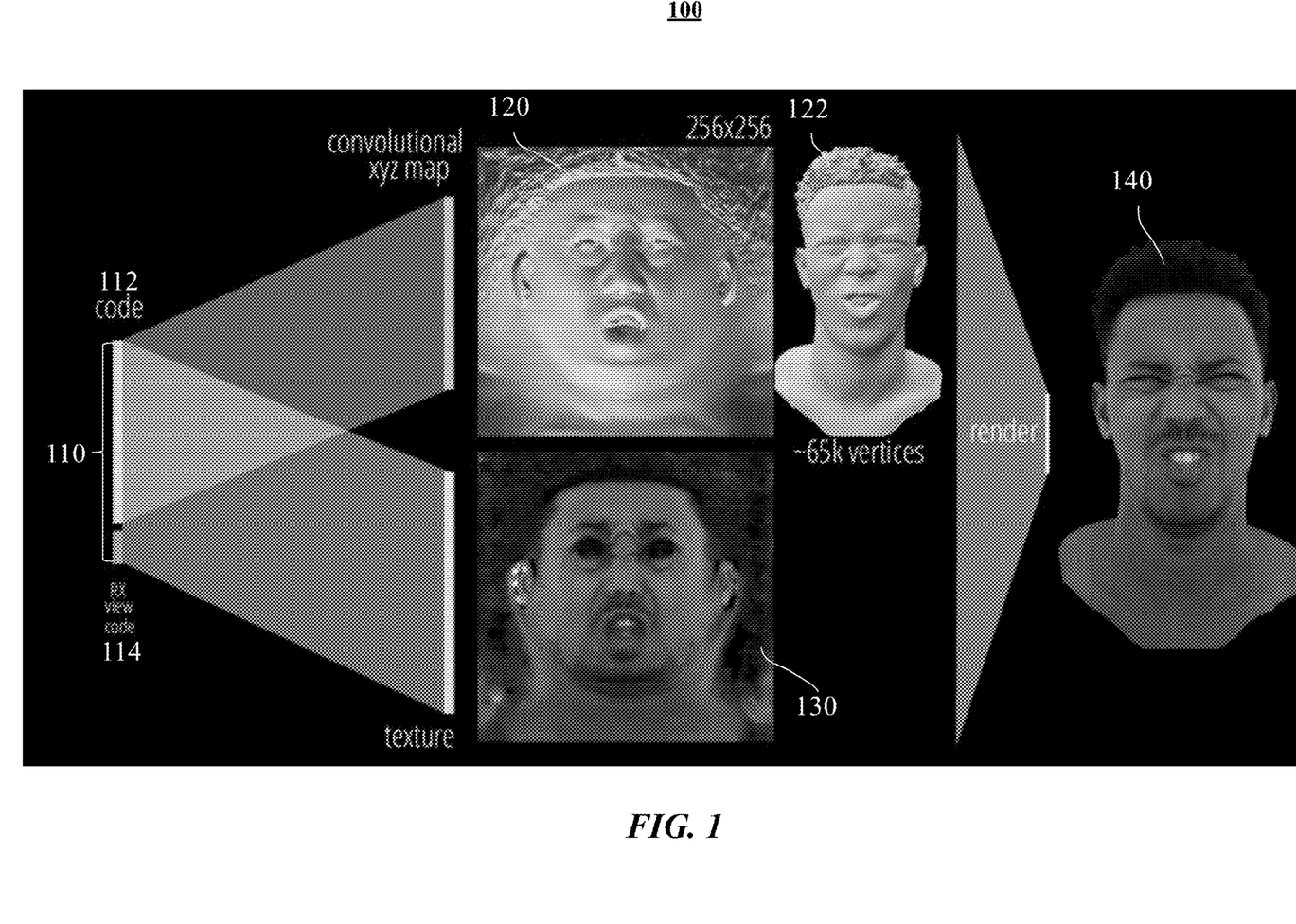
FIG. 1 illustrates an example diagram of an avatar-rendering system architecture.

FIG. 1 illustrates an embodiment of an avatar-rendering system architecture, in accordance with certain embodiments. The avatar-rendering system 100 may access to a codec 110 of an object which encodes appearance information associated with the object. For example, the avatar-rendering system 100 may generate the codec 110 based on input images of the object and/or an input track mesh of the object generated based on depth measurements. The avatar-rendering system 100 can also retrieve an established codec 110 of the object from a storage, e.g., a cloud or a memory implemented in a head-mounted display (HMD). In particular embodiments, the input mesh may be a coarse mesh representation of the object's features, which features may be computed based on depth measurements of the input images of the object. For example, a template mesh may be distorted or modified based on the depth measurements of the features of the object, so that the distorted input mesh may reflect a contour of the object. In particular embodiments, the input mesh may be a low-resolution geometry with tracking features. In particular embodiments, the input mesh may have approximately 7,000 vertices.

A decoder of the avatar-rendering system 100 decodes the codec 110 to render an image 140 of the object, such as an avatar of a user. In particular embodiments, the codec 110 comprises a code 112 to produce a position map 120 of the object and a view code 114 to produce a texture 130 of the object based on the code 112 from certain viewpoints. The decoder decodes the code 112 to generate the position map 120 based on the geometry of the object via a machine-learning model. In particular embodiments, the position map 120 may be an unwrapped image which comprises multiple pixels defining a contour of the object. Each pixel in the position map 120 corresponds to a coordinate to represent a location of the pixel. In particular embodiments, the coordinate of the pixel may be a X-Y-Z coordinate. The coordinate of each pixel may be processed to generate a vertex in a mesh 122. For example, the position map 120 may be a two-dimensional map, and the coordinates stored within the position map 120 are three-dimensional. In other words, the position map 120 may be warped/convoluted into a convolutional, three-dimensional map to generate the mesh 122 based on the vertices provided by the coordinate of each pixel. The mesh 122 is a high-resolution mesh which has more vertices than the input mesh used to generate the codec 110. In particular embodiments, the mesh 122 may have approximately 65,000 vertices.

In particular embodiments, the decoder of the avatar-rendering system 100 may be a high-resolution decoder which may utilize the input images and the identified features from the input images to generate the position map 120, e.g., the high-resolution mesh 122, directly. In particular embodiments, the decoder of the avatar-rendering system 100 may also utilize the input images and the input mesh generated based on the input images to generate the position map 120, e.g., the high-resolution mesh 122, directly. Under these scenarios, the decoder of the avatar-rendering system 100 may utilize input images of the object to generate the high-resolution mesh without building a codec 110 (e.g., a low-resolution codec).

Furthermore, the decoder of the avatar-rendering system 100 decodes the code 112 and the view code 114 to generate the texture 130 of the object from at least one viewpoint. For example, the texture 130 of the object may be generated based multiple view-conditional textures from different viewpoints. The texture 130 may be an unwrapped texture image of the object. Based on the mesh 122 and the texture 130 of the object, the machine-learning model may render an image 140 of the object, e.g., a facial avatar of a user. In particular embodiments, the avatar-rendering system 100 may also be applied to reconstruct a body of the user to render different body parts for the user.

As mentioned above, an input mesh is a low-resolution mesh which cannot reproduce the input image accurately due to the lack of geometry information. For example, the input mesh may not represent much geometry information inside the user's mouth since the depth measurements inside the user's mouth might be inaccurate or inoperable, and therefore, the input mesh might have very few or no vertex to represent teeth or a protruding tongue of the user. Each pixel in the position corresponds to a three-dimensional coordinate to represent a location of the pixel, and the coordinates of pixels may further be used to generate vertices in a mesh. Under certain scenarios, considering computing performance and vertex determination, a step of sampling pixels to determine a corresponding vertex in the mesh may be introduced.

Embodiments of the machine-learning (ML) model can be trained and applied to various imagery tasks for computational displays by changing the input and output of the network. In particular embodiments, the ML model may be an autoencoder, a generative adversarial network, or any other suitable ML architecture. Embodiments of the ML model may be configured to generate images for wide field of view (FOV) displays, holographic displays, light field displays, and any other suitable displays.

Figure 2:
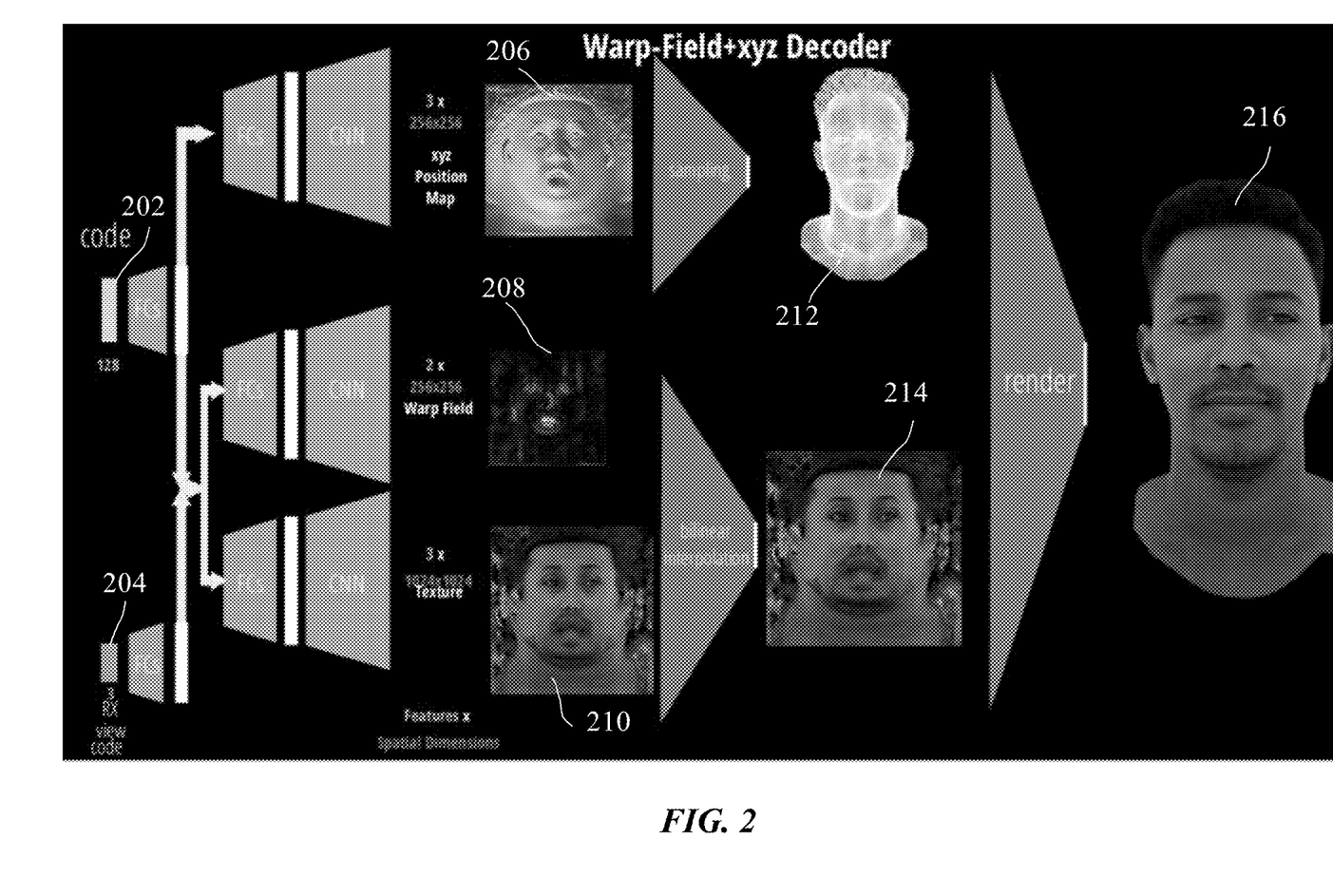
FIG. 2 illustrates another example diagram of an avatar-rendering system architecture.

FIG. 2 illustrates an embodiment of an avatar-rendering system architecture with a warp field, in accordance with certain embodiments. The avatar-rendering system 200 may access to a codec of an object which encodes appearance information associated with the object. The codec comprises a code 202 which can be decoded to generate a position map 206 of the object and a view code 204 which can provide one or more viewpoints to generate view-conditional textures 210 of the object. In particular embodiments, the avatar-rendering system 200 comprises a decoder which utilizes one or more fully connected layers and a convolutional neural network to decode the code 202 and the view code 204 to generate the position map 206 and the texture 210 of the object. The decoder is a convolutional decoder which maps the code 202 to the position map 206 of the object. Likewise, the convolutional decoder can also be used to perform a mapping from the code 202 and the view code 204 to the texture 210 of the object. Furthermore, the avatar-rendering system 200 may comprise a warp field 208 to improve the accuracy of the texture 210 when the texture 210 is warped to render an image 216 of the object.

The decoder of the avatar-rendering system 200 decodes the code 202 to produce the position map 206 of the object based on the geometry of the object via a machine-learning model. In particular embodiments, the position map 206 may be an unwrapped image which comprises multiple pixels defining a contour of the object. Each pixel in the position map 206 corresponds to a coordinate to represent a location of the pixel. In particular embodiments, the coordinate of the pixel may be a X-Y-Z coordinate. The decoder may sample the pixels in the position map 206 based on the coordinates of the pixels to determine vertices of a mesh 212 of the object. For example, the pixels in the position map 206 may be sampled to determine a corresponding vertex by interpolating nearby pixels to fill in gap regions between vertices, because sometimes not every pixel has a corresponding vertex, e.g., a rather flat surface of the object or lack of geometry information, and furthermore, the determined vertices are interconnected with each other to generate the mesh 212. As a result, the position map 206 can be convoluted to the mesh 212 based on the vertices determined by the sampled pixels. Due to a finer/dense mesh which has more vertices than an input mesh used to generate the codec, the mesh 212 has higher resolution and reproduces the details in the input image of the object.

Furthermore, the decoder of the avatar-rendering system 200 decodes the code 202 and the view code 204 to generate the warp field 208 and the texture 210 of the object from at least one viewpoint. For example, the texture 210 of the object may be generated based on multiple view-conditional textures from different viewpoints. In particular embodiments, the decoder of the avatar-rendering system 200 may determine a color (e.g., RGB, HEX, or CMYK) for each pixel in the position map 206 and generate the texture 210 based on the determined colors of pixels. The texture 210 may be an unwrapped texture image of the object, and the warp field 208 may align the texture 210 from a viewpoint where the texture 210 would be viewed to obtain a final texture 214. In particular embodiments, the warp field 208 would deform/warp or realign the texture 210 by bilinear interpolation to generate the final texture 214 based on a viewpoint of a viewer. For example, a mole on a user's cheek in the texture 210 may be fixed by the warp field 210 as the same position where the mole should be from the viewer's perspective, such that the final texture 214 is accurate and detailed.

Based on the mesh 212 and the final texture 214 of the object, the machine-learning model may render the image 216 of the object, e.g., a facial avatar of a user. In particular embodiments, the avatar-rendering system 200 may also be applied to reconstruct a body of the user to render different body parts for the user.

Figure 3A:
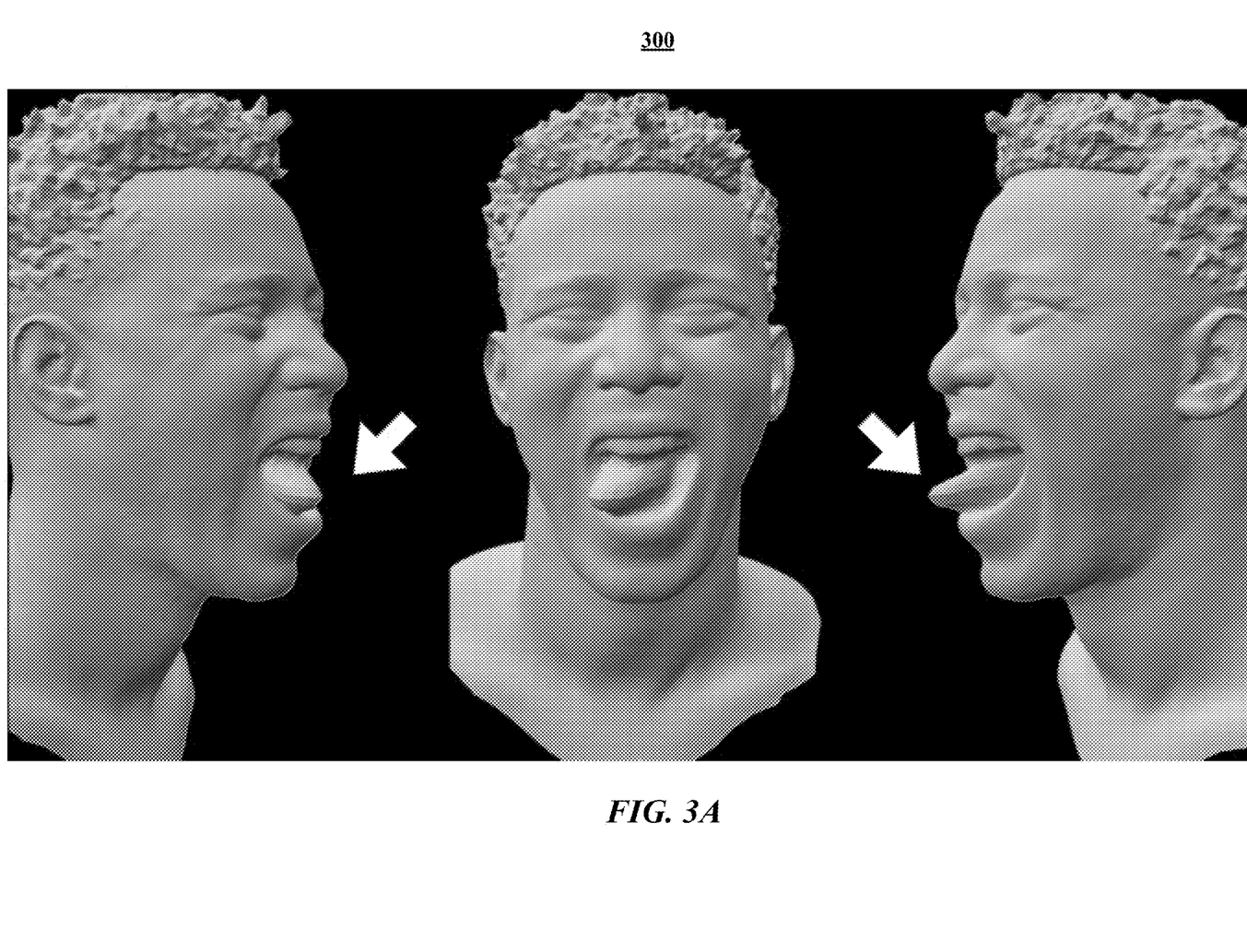
FIGS. 3A-3C illustrate an example embodiment of rendering an image of an object with a high-resolution mesh.
Figure 3B:
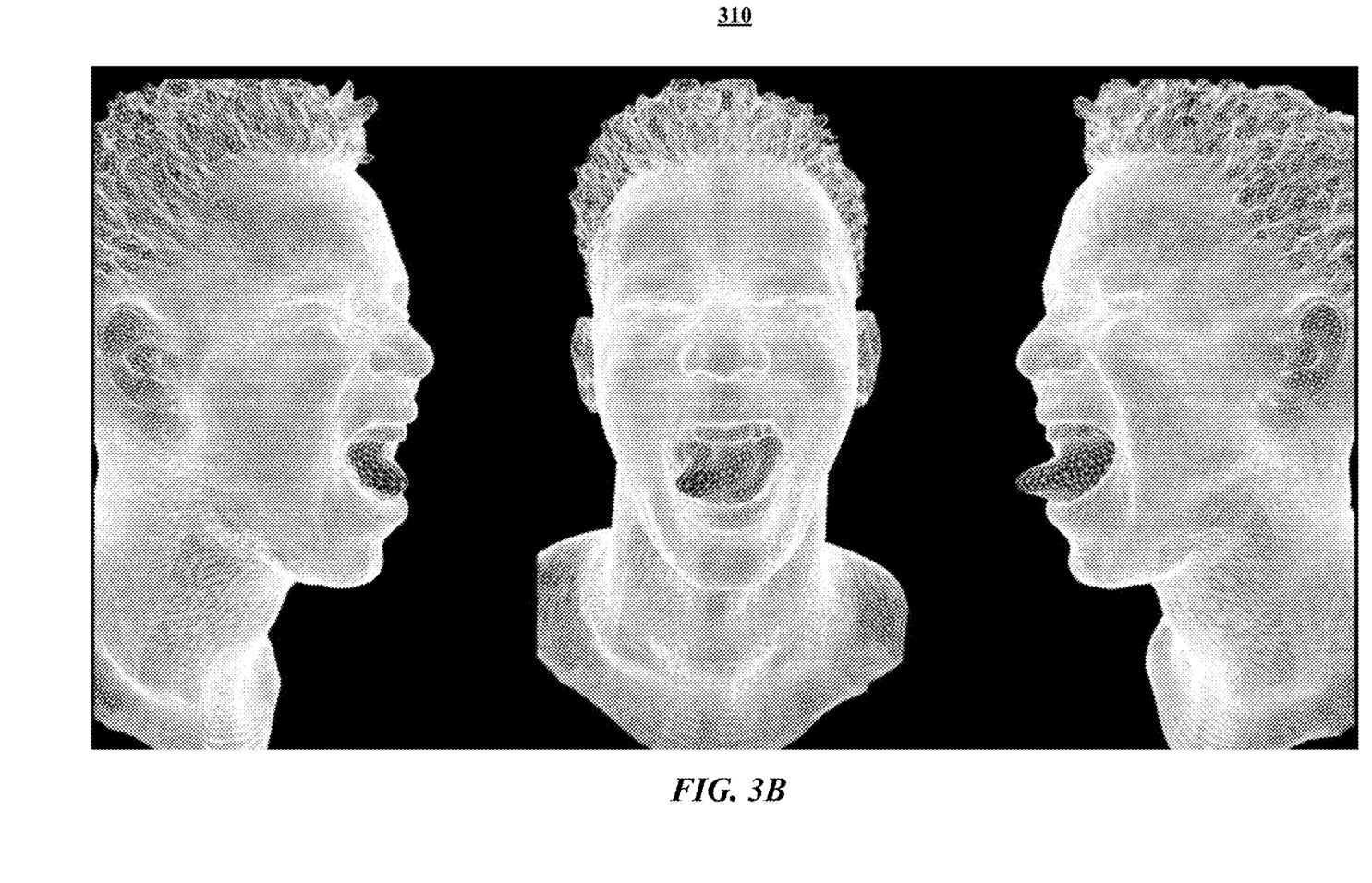
Figure 3C:
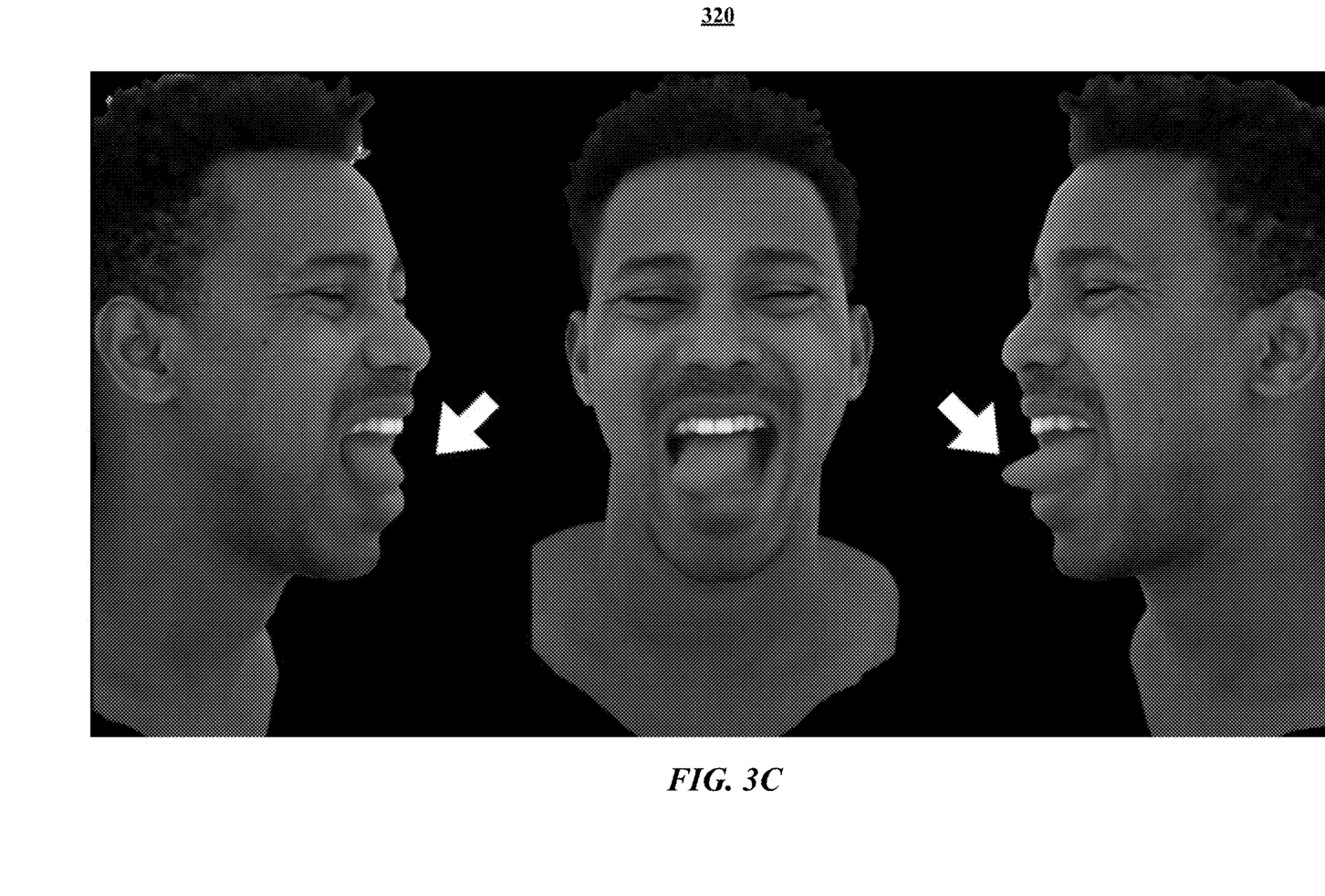

FIGS. 3A-3C illustrate an embodiment of rendering an image of an object with a high-resolution mesh, in accordance with certain embodiments. FIG. 3A illustrates a geometry of an object generated by sampling a position map 300 into a mesh and rendering the mesh with surface normal information. Each pixel in the position map 300 corresponds to a three-dimensional coordinate to represent a location of the pixel relative to a space. The warped position map 300 (e.g., the high-resolution mesh) describes a contour of the object and details which might be absent in an input mesh because of the lack of geometry, e.g., a protruding tough. FIG. 3B illustrates a high-resolution mesh 310 of the object. The mesh 310 comprises multiple vertices which are interconnected with each other and are generated by sampling the pixels in the position map 300. For example, a vertex may be determined by sampling a number of pixels based on the pixels' coordinates, and the determined vertex may then be assigned with a corresponding coordinate which is a three-dimensional (X-Y-Z) coordinate representing a location of the vertex in a three-dimensional space. FIG. 3C illustrates a rendered image 320 of the object. The rendered image 320 is generated based on the mesh 310 and a texture of the object. In particular embodiments, the texture of the object may be reproduced using the methods disclosed in FIGS. 1 and 2. The rendered image 320 of the object can reproduce an input image of the object accurately with aligned texture and features which are absent in the input mesh.

Figure 4A:
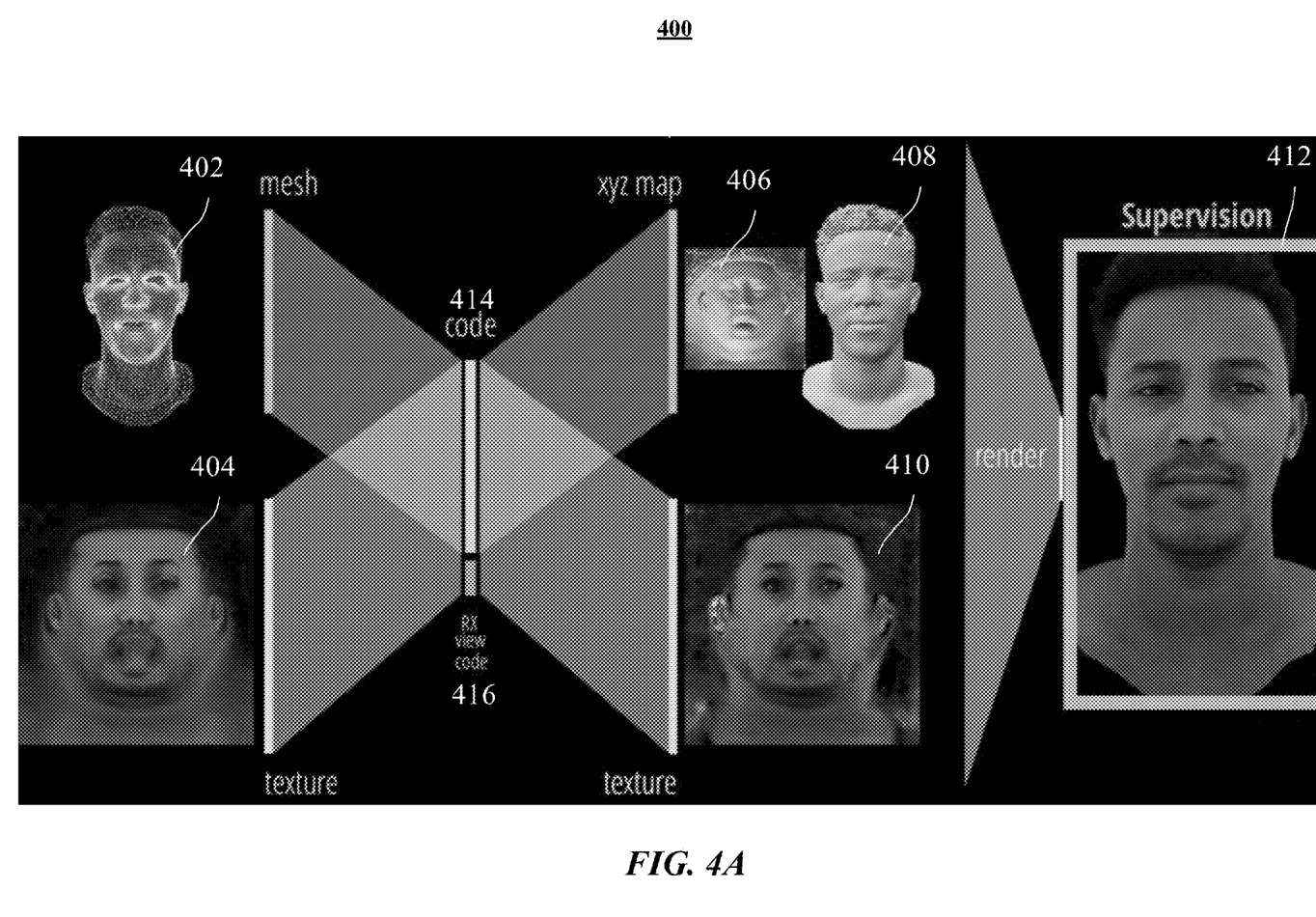
FIGS. 4A-4C illustrate an example embodiment of training a machine-learning model to render an image of an object with a high-resolution mesh.
Figure 4B:
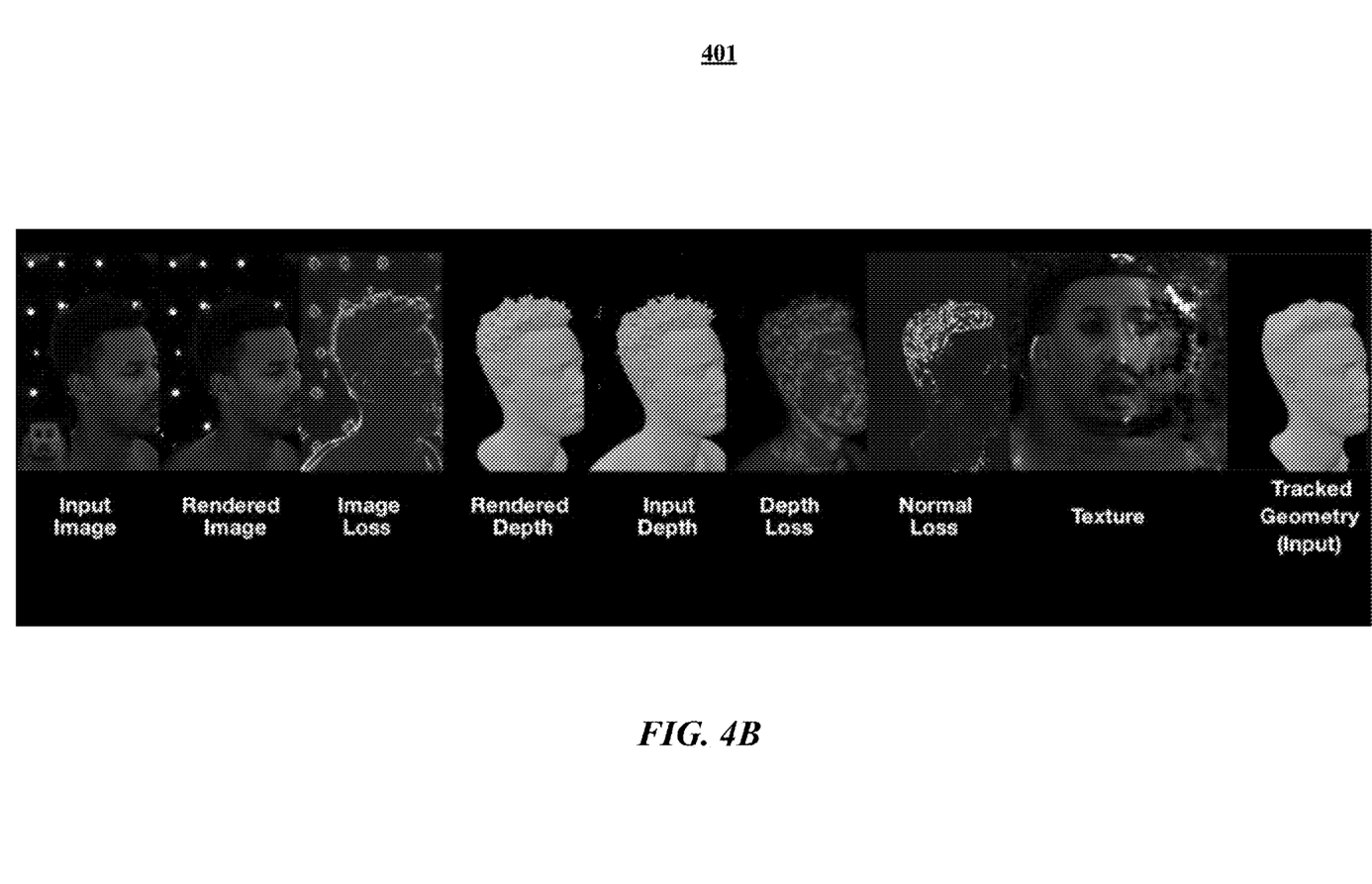
Figure 4C:
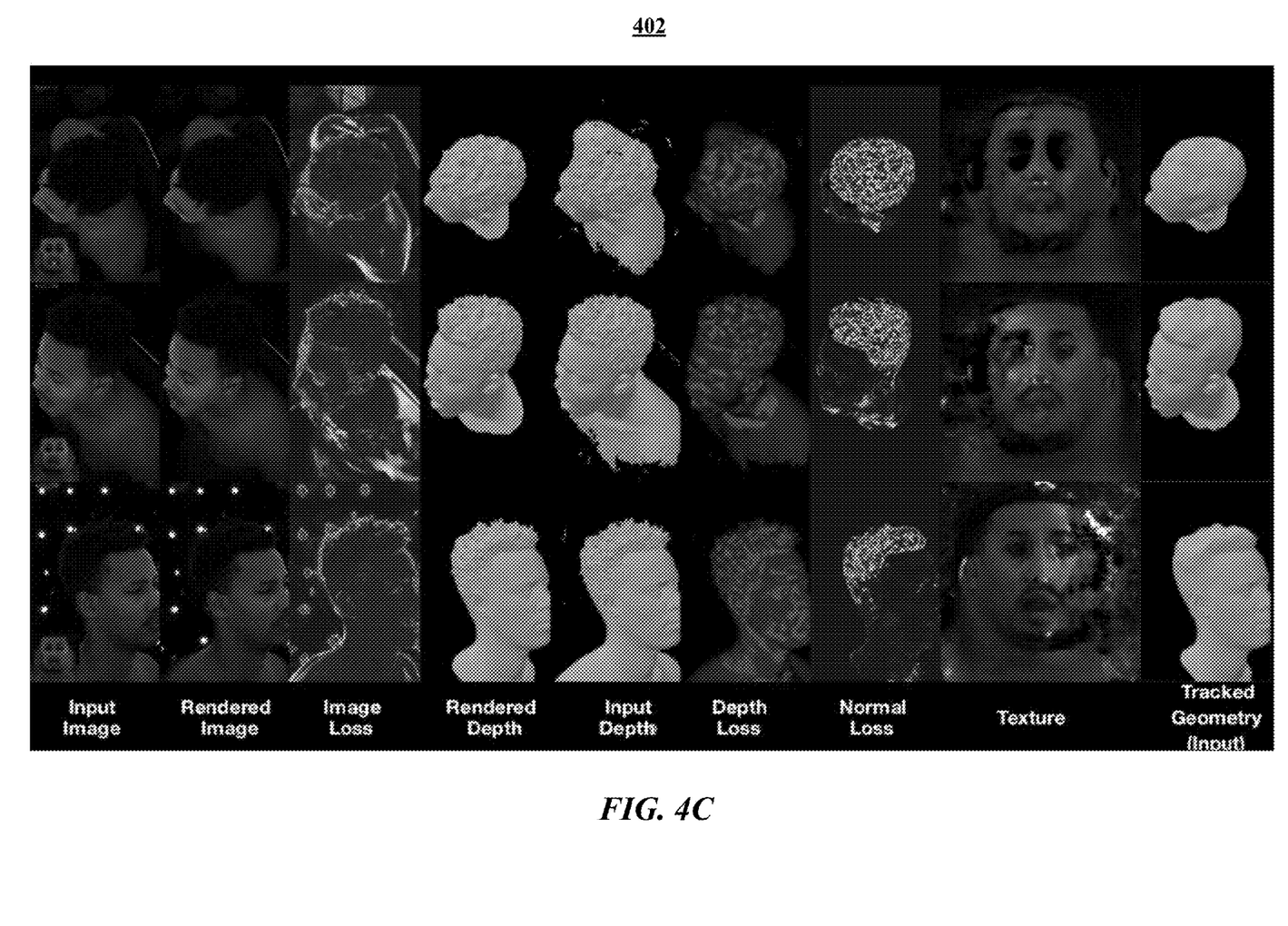

FIGS. 4A-4C illustrate an embodiment of training a machine-learning model to render an image of an object with a high-resolution mesh, in accordance with certain embodiments. In FIG. 4A, a machine-learning model 400 is trained based on a supervision between a rendered image 412 of an object and an input image of the object. For example, a decoder renders the image 412 of the object based on a high-resolution mesh 408 and a texture 410 of the object, and the rendered image 412 is compared with the input image of the object to calculate a loss between them to update the machine-learning model 400. In particular embodiments, the mesh 408 of the object may be generated based on a position map 406 of the object using the methods disclosed in FIGS. 1 and 2. In particular embodiments, the position map 406 of the object may be generated based on a code 414 in a codec of the object using the methods disclosed in FIGS. 1 and 2. In particular embodiments, the texture 410 of the object may be generated based on the code 414 and a view code 416 in the codec of the object using the methods disclosed in FIGS. 1 and 2.

The machine-learning model 400 supervises the rendered image 412 of the object by comparing it with the input image of the object, instead of supervising the mesh 408 and the texture 410 using an input mesh 402 and an input texture 404 which are used to generate the codec of the object. For example, the input mesh 402 is generated by depth measurements of features of the objects and therefore has a low-resolution geometry, such that the input mesh 402 cannot provide a feature-tracking when comparing it with the high-resolution mesh 408 since it lacks a corresponding geometry information to support, e.g., the protruding tongue is missing from the input mesh 402 and cannot be tracked in both of the input mesh 402 and the mesh 408. The machine-learning model 400 may be trained to reproduce/be consistent with the input image of the object by updating a loss between the rendered image 412 and the input image.

In FIG. 4B, a machine-learning model 401 may be trained by different losses between the input image and the rendered image, such as an image loss, a depth loss, and a normal loss. The losses which may be used to train the machine-learning model 401 comprise, but are not limited to, a rendered image loss, a rendered depth loss, a normal loss, a previous geometric smoothness, and a matching tracking feature. In particular embodiments, the image loss may be calculated by comparing the rendered image of the object with the input image of the object. In particular embodiments, the depth loss may be calculated by comparing depth measurements of the render image with depth measurements of the input image. In particular embodiments, the normal loss may be a gradient between the depth measurements of the render image and the depth measurements of the input image which is used to obtain a better curvature of the object in the rendered image. In particular embodiments, the previous geometric smoothness may be a loss caused by smoothing the object in the rendered image. In particular embodiments, the matching tracking feature may be a feature which could be determined in both of the input image and the rendered image, e.g., tracking mesh vertices or keypoints, so that the machine-learning model 401 may be trained by comparing the tracking features in the input image with corresponding tracking features in the rendered image. For example, a tracking feature may be determined from the input image of the object based on depth measurements, e.g., a tip of the nose. The tracking feature from the input image may match a corresponding feature in the rendered image (also a tip of the nose). By comparing the difference between the tracking feature in the input image and the corresponding feature in the rendered image, the machine-learning model 401 may be trained by a loss calculated based on the comparison.

In particular embodiments, smoothing depth in the rendered image (e.g., an output image) comprises downsampling or filtering the rendered image with various filters to compute different image losses. In particular embodiments, smoothing depth in the rendered image comprises rendering object masks as an image, which indicates which part of the image belongs to which part of the object, to explicitly penalize the visible contours of the object, by comparing it to the masks of the object that are computed from the input image. In particular embodiments, smoothing depth in the rendered image comprises filtering operations on depth or render normal/general depth to compute the normal loss.

In FIG. 4C, a machine-learning model 402 may also be trained by stochastic gradient descent by available frames from available camera views. In particular embodiments, each batch of training frames may be a random sampling of frames from different views.

In particular embodiments, the machine-learning model 400, 401, 402 for the avatar-rendering system may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the machine-learning model. In the present disclosure, a user may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the avatar-rendering system.

This disclosure contemplates any suitable network to connect each element in the avatar-rendering system or to connect the avatar-rendering system with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 5:
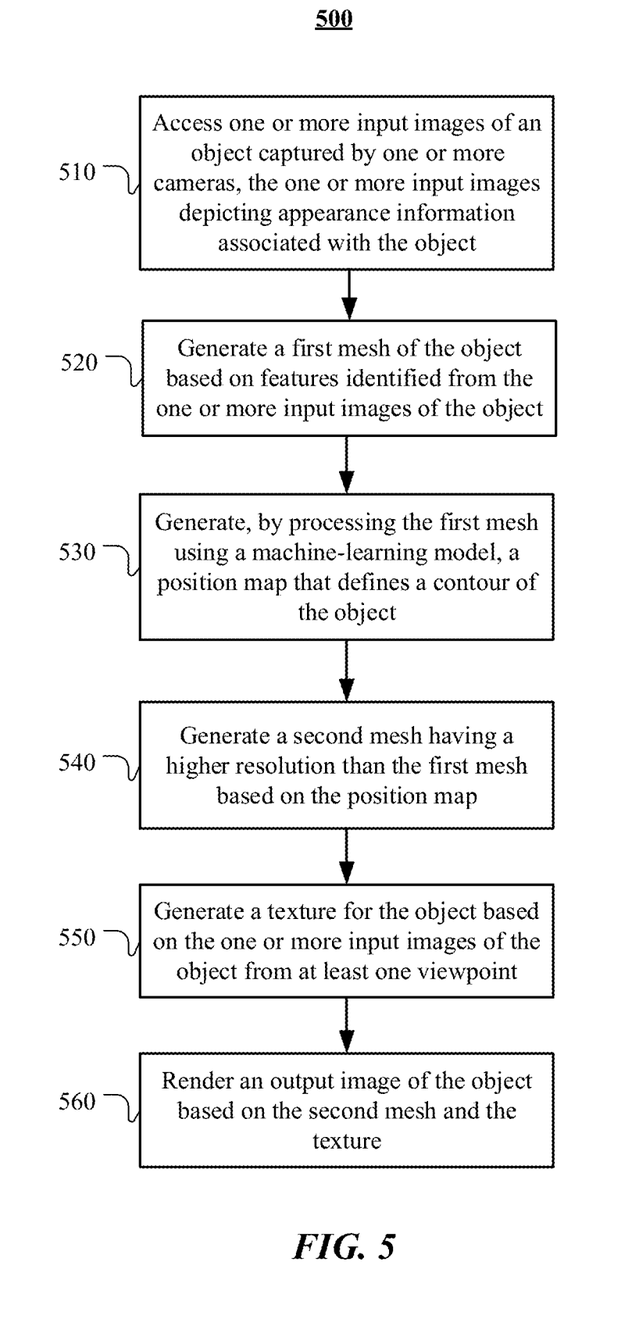
FIG. 5 illustrates an example embodiment of rendering an output image of an object based on a high-resolution mesh.

FIG. 5 illustrates an example method 500 for rendering an image of an object based on a high-resolution mesh, in accordance with certain embodiments. The method 500 may be implemented in the wearable device (e.g., a head-mounted display). The image rendered by the method 500 may also be provided to or displayed on any computing system (e.g., an end user's device, such as a smartphone, virtual reality system, gaming system, etc.). The method 500 may begin at step 510 with accessing one or more inputs image of an object captured by one or more cameras. The one or more input images depict appearance information associated with the object.

At step 520, the method 500 may generate a first mesh of the object based on features identified from the one or more input images.

At step 530, the method 500 may generate, by processing the first mesh using a machine-learning model, a position map that defines a contour of the object. Each pixel in the position map corresponds to a three-dimensional coordinate. In particular embodiments, the method 500 may also utilize the one or more input images directly to track the features to generate the position map via the machine-learning model.

At step 540, the method 500 may generate a second mesh having a higher resolution than the first mesh based on the position map. In particular embodiments, the second mesh may be generated by sampling pixels in the position map based on geometry, determining vertices from each of the sampled pixels in the position map, and generating the second mesh based on the determined vertices.

At step 550, the method 500 may generate a texture for the object based on the one or more input images of the object from at least one viewpoint. In particular embodiments, the texture may be generated by determining a corresponding color for each pixel in the position map based on a first texture of the object. The first texture of the object may be generated based on the one or more input images of the object from at least one viewpoint. Furthermore, the method may generate a second texture for the object based on the corresponding color for each pixel and the at least one viewpoint, and render an avatar of the object based on the second mesh and the second texture.

At step 560, the method 500 may render an output image of the object based on the second mesh and the texture. In particular embodiments, the machine-learning model may be configured to generate images for television monitors, cinema screens, computer monitors, mobile phones, or tablets.

In particular embodiments, the machine-learning model may be trained by comparing the output image of the object with the one or more input images of the object, and calculating an image loss based on the comparison to update the machine-learning model.

In particular embodiments, the machine-learning model may be trained by measuring input depth measurements in the one or more input images of the object, computing output depth measurements in the output image of the object, comparing the output depth measurements with the input depth measurements, and calculating an output depth loss based on the comparison to update the machine-learning model.

In particular embodiments, the machine-learning model is trained by measuring input depth measurements in the one or more input images of the object, smoothing the output image of the object to obtain a curvature of the object, computing smoothed depth measurements in the smoothed output image of the object, comparing the smoothed depth measurements with the input depth measurements, and calculating a normal loss based on the comparison to update the machine-learning model.

In particular embodiments, the machine-learning model may be trained by comparing each of the features in the one or more input images of the object with its corresponding feature in the output image of the object, and calculating a tracking loss based on the comparison to update the machine-learning model.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for local localization including the particular steps of the method of FIG. 5, this disclosure contemplates any suitable method for local localization including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
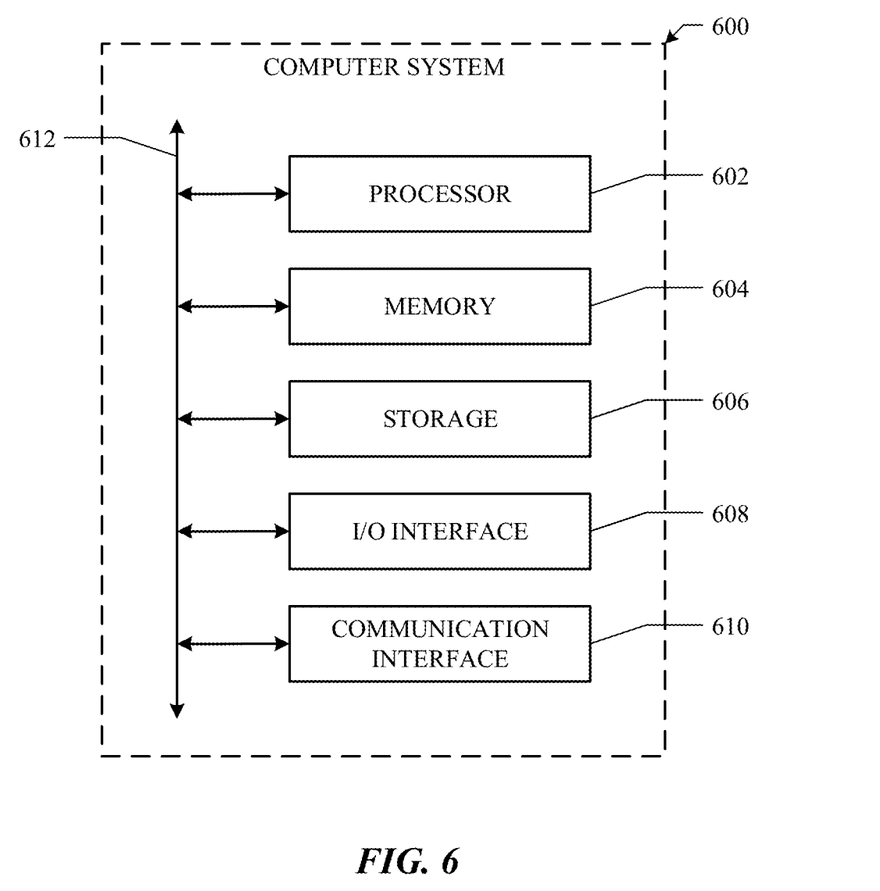
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that a dense/higher-resolution mesh can provide sufficient geometry information to reproduce the object in input images accurately. The dense mesh in the present disclosure is generated based on a position map comprising pixels being assigned a coordinate, such that pixels in the position map can contribute to the determination of vertices in the dense mesh. The dense mesh comprises geometry information supported by the determined vertices which might be absent in the input mesh. Therefore, the final/rendered image of the object generated based on the dense mesh is accurate and detailed. Furthermore, particular embodiments of the present disclosure also comprise a warp field/displacement field to realign the generated texture based on the viewer's viewpoint. With a high-resolution mesh and a precise, aligned texture, the rendered image disclosed in the present disclosure may be improved with details.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
accessing one or more input images of an object captured by one or more cameras, the one or more input images depicting appearance information associated with the object;
generating a first mesh of the object based on features identified from depth measurements of the one or more input images of the object;
generating, by processing the first mesh and an initial texture of the object using a machine-learning model, (a) a position map that is a two-dimensional image defining an unwrapped geometry of the object, (b) an intermediate texture of the object, and (c) a warp field, wherein each pixel in the position map specifies a corresponding three-dimensional location of the object using a three-dimensional coordinate;
generating a second mesh based on the position map, wherein the second mesh has a higher resolution than the first mesh;
generating an output texture corresponding to the second mesh by warping the intermediate texture using the warp field; and
rendering an output image of the object based on the second mesh and the output texture.

2. The method of claim 1, wherein generating the second mesh based on the position map comprises:
sampling pixels in the position map based on geometry;
determining vertices from each of the sampled pixels in the position map; and
generating the second mesh based on the determined vertices.

3. The method of claim 1, wherein the machine-learning model is trained by:
comparing the output image of the object with the one or more input images of the object; and
calculating an image loss based on the comparison to update the machine-learning model.

4. The method of claim 1, wherein the machine-learning model is trained by:
measuring input depth measurements in the one or more input images of the object;
computing output depth measurements in the output image of the object;
comparing the output depth measurements with the input depth measurements; and
calculating an output depth loss based on the comparison to update the machine-learning model.

5. The method of claim 1, wherein the machine-learning model is trained by:
measuring input depth measurements in the one or more input images of the object;
smoothing depth in the output image of the object to obtain a curvature of the object;
computing smoothed depth measurements in the output image of the object;
comparing the smoothed depth measurements with the input depth measurements; and
calculating a normal loss based on the comparison to update the machine-learning model.

6. The method of claim 1, wherein the machine-learning model is trained by:
comparing each of the features in the one or more input images of the object with its corresponding feature in the output image of the object; and
calculating a tracking loss based on the comparison to update the machine-learning model.

7. The method of claim 1, wherein the machine-learning model is configured to generate images for television monitors, cinema screens, computer monitors, mobile phones, or tablets.

8. One or more computer-readable non-transitory storage media embodying software that is operable when executed to:
access one or more input images of an object captured by one or more cameras, the one or more input images depicting appearance information associated with the object;
generate a first mesh of the object based on features identified from depth measurements of the one or more input images of the object;
generate, by processing the first mesh and an initial texture of the object using a machine-learning model, (a) a position map that is a two-dimensional image defining an unwrapped geometry of the object, (b) an intermediate texture of the object, and (c) a warp field, wherein each pixel in the position map specifies a corresponding three-dimensional location of the object using a three-dimensional coordinate;
generate a second mesh based on the position map, wherein the second mesh has a higher resolution than the first mesh;
generate an output texture corresponding to the second mesh by warping the intermediate texture using the warp field; and
render an output image of the object based on the second mesh and the output texture.

9. The media of claim 8, wherein generating the second mesh based on the position map comprises:
sampling pixels in the position map based on geometry;
determining vertices from each of the sampled pixels in the position map; and
generating the second mesh based on the determined vertices.

10. The media of claim 8, wherein the machine-learning model is trained by:
comparing the output image of the object with the one or more input images of the object; and calculating an image loss based on the comparison to update the machine-learning model.

11. The media of claim 8, wherein the machine-learning model is trained by:
measuring input depth measurements in the one or more input images of the object;
computing output depth measurements in the output image of the object;
comparing the output depth measurements with the input depth measurements; and
calculating an output depth loss based on the comparison to update the machine-learning model.

12. The media of claim 8, wherein the machine-learning model is trained by:
measuring input depth measurements in the one or more input images of the object;
smoothing depth in the output image of the object to obtain a curvature of the object;
computing smoothed depth measurements in the output image of the object;
comparing the smoothed depth measurements with the input depth measurements; and
calculating a normal loss based on the comparison to update the machine-learning model.

13. The media of claim 8, wherein the machine-learning model is trained by:
comparing each of the features in the one or more input images of the object with its corresponding feature in the output image of the object; and
calculating a tracking loss based on the comparison to update the machine-learning model.

14. The media of claim 8, wherein the machine-learning model is configured to generate images for television monitors, cinema screens, computer monitors, mobile phones, or tablets.

15. A system comprising: one or more processors; and one or more computer-readable non-transitory storage media coupled to one or more of the processors and comprising instructions operable when executed by one or more of the processors to cause the system to:
access one or more input images of an object captured by one or more cameras, the one or more input images depicting appearance information associated with the object;
generate a first mesh of the object based on features identified from depth measurements of the one or more input images of the object;
generate, by processing the first mesh and an initial texture of the object using a machine-learning model, (a) a position map that is a two-dimensional image defining an unwrapped geometry of the object, (b) an intermediate texture of the object, and (c) a warp field, wherein each pixel in the position map specifies a corresponding three-dimensional location of the object using a three-dimensional coordinate;
generate a second mesh based on the position map, wherein the second mesh has a higher resolution than the first mesh;
generate an output texture corresponding to the second mesh by warping the intermediate texture using the warp field; and
render an output image of the object based on the second mesh and the output texture.

16. The system of claim 15, wherein generating the second mesh based on the position map comprises:
sampling pixels in the position map based on geometry;
determining vertices from each of the sampled pixels in the position map; and
generating the second mesh based on the determined vertices.

17. The system of claim 15, wherein the machine-learning model is trained by:
comparing the output image of the object with the one or more input images of the object; and
calculating an image loss based on the comparison to update the machine-learning model.

18. The system of claim 15, wherein the machine-learning model is trained by:
measuring input depth measurements in the one or more input images of the object;
computing output depth measurements in the output image of the object;
comparing the output depth measurements with the input depth measurements; and
calculating an output depth loss based on the comparison to update the machine-learning model.

19. The system of claim 15, wherein the machine-learning model is trained by:
measuring input depth measurements in the one or more input images of the object;
smoothing depth in the output image of the object to obtain a curvature of the object;
computing smoothed depth measurements in the output image of the object;
comparing the smoothed depth measurements with the input depth measurements; and
calculating a normal loss based on the comparison to update the machine-learning model.

20. The system of claim 15, wherein the machine-learning model is trained by:
comparing each of the features in the one or more input images of the object with its corresponding feature in the output image of the object; and
calculating a tracking loss based on the comparison to update the machine-learning model.

* * * * *